May 10, 1938.  H. CHIREIX  2,116,667

RADIO BEACON AND BLIND LANDING SYSTEM

Filed June 12, 1935    2 Sheets-Sheet 1

INVENTOR
HENRI CHIREIX
BY
ATTORNEY

Patented May 10, 1938

2,116,667

UNITED STATES PATENT OFFICE

2,116,667

RADIO BEACON AND BLIND LANDING SYSTEM

Henri Chireix, Paris, France, assignor to Compagnie Generale De Telegraphie Sans Fil, a corporation of France Application June 12, 1935, Serial No. 26,179
In Spain and Tunis April 11, 1934

6 Claims. (Cl. 250—11)

This invention relates to radio direction finders and has particular reference to a device of this character which may be useful to an aviator in making a blind landing.

The landing of airplanes in airports or flying fields at night time and during foggy weather involves two navigational problems, to wit (1) determination of the course to follow for the last few miles before the airport is reached; and (2) determination of the path to be followed during the descent until ground contact is made.

Every airport has a preferable landing direction which, in general, is governed by the direction of the wind and by the absence of high obstacles. A radio beacon can usually be oriented so as to transmit signals which are indicative of this landing direction.

The present invention has for its object to impart indications and clues to the pilot that are easy to follow, that are persistent and free from lag, and allow the pilot under conditions of low visibility to place himself on an axis plotted in accordance with the direction of landing, and then to direct the aircraft on a descending trajectory or path for making a blind landing.

The invention for this purpose makes use of very short waves, say, waves less than 10 meters, such as are adapted to be directed readily both in a horizontal sense as well as vertically.

The invention consists in disposing in the neighborhood of the airport and symmetrically in reference to the landing axis governed by the direction of approach of the same, two transmitters generating ultra-short waves and working on neighboring wavelengths, say, 7 and 8 meters, and modulated in such a fashion that the waves picked up by a receiver apparatus mounted on board an airplane make it feasible, by the aid of a suitable device such as a cathode-ray oscillograph, phase indicator, meter, or the like, to obtain characteristic figures or indications depending at the same time upon the course followed and upon the downward trajectory.

In order to obtain suitable indications for enabling an aircraft pilot to make a blind landing, the radio energy of two transmitters is preferably modulated, according to this invention, by a frequency considerably lower than the carrier frequency. For instance, 500 kilocycles, or 600 meters may be used as the modulation frequency for both transmitters, though one is shifted in phase in reference to the other by a certain electrical angle, say, of 90°.

My invention will be best understood from the following detailed description when read in connection with the accompanying drawings in which.

The invention is capable of being carried into effect in various ways. According to a particularly simple embodiment, the receiver set mounted on the airplane comprises two circuits tuned respectively to one and the other of the two transmitter frequencies, say, 7 and 8 meters as hereinbefore suggested by way of example. Output energy from these two circuits may then be detected and amplified, if desired, finally feeding the same to two pairs of deflection plates of a cathode-ray oscillograph.

Figure 1:
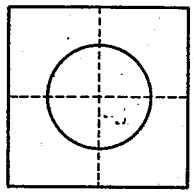
Figures 1 and 2 are representations respectively of visual images which may be formed on the fluorescent screen of a cathode ray tube for the guidance of a pilot.

If the airplane then follows the landing axis, that is to say, if it keeps at the same distance from the two transmitters, the phase displacement of the two modulations remains constant and the spot of the oscillograph describes a circle as shown in Fig. 1.

Figure 2:
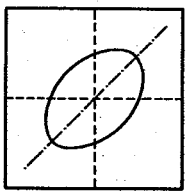

If, however, the airplane leaves the proper course, it will naturally approach one of the senders and will recede from the other. As a result the phase difference varies and the circumference or circle traced by the oscillograph spot changes into a more or less flattened ellipse according to the departure from the proper course as shown in Fig. 2. The sense of such deformation, in other words, the inclination or slope to the right or to the left-hand side of the major axis of the ellipse indicates directly the sense of the change in the course of the airplane. It will also be noted that the use of the phase-shift effect endows the apparatus with great sensitiveness, for even a slight difference in course gives rise to a rather appreciable deformation of the diagram.

In order to keep on the landing axis the pilot has nothing else to do than to follow the indication of the oscillograph, correcting his steering and course in order that circular shape of the diagram may be constantly maintained.

Figure 3:
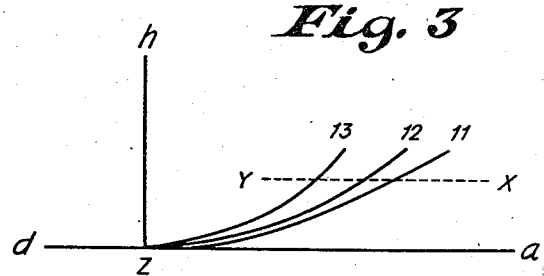
Fig. 3 is a diagram showing alternative landing curves along which an aviator may glide until he reaches ground contact.
Figure 4:
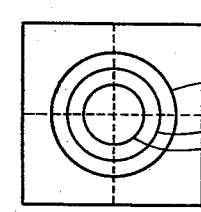
Fig. 4 is a diagram of alternative image representations such as would appear if corresponding landing curves were followed as shown in Fig. 3.

The correct path of descent to the point of ground contact is conveniently indicated, according to my invention, by working the oscillograph so that it shall cause the electron beam to describe a circular path of constant diameter. It is known, as a matter of fact, that equal-intensity curves of the field radiated in a vertical plane by an ultra-short-wave transmitter, owing to the presence of the ground, has a trend or shape such as illustrated by the graphs 11, 12, 13, of Fig. 3. Here $h$ denotes the vertical distance above one of the transmitters, and the line $a-d$ represents the ground level, or base of the landing axis. One of these curves, say, graph 12 corresponds sensibly to the path or trajectory to be followed in the down glide. If the airplane follows one of these curves, with the intensity of the field remaining constant, the diameter of the circle plotted by the spot of the oscillograph remains unvaried. For the three trajectories 11, 12, 13, the pilot will see, for instance, the circular diagrams represented respectively, by 21, 22, 23, Fig. 4. If he has chosen the landing path 12, and the airplane is approaching the landing field Z along a horizontal course the elevation of which is indicated by the line X—Y, he will note a gradual growth of the diameter of the circle traced by the spot of the oscillograph. When the spot describes such a circle as that shown at 22, the pilot starts descending along the path 12, and in order to keep on this path he will see to it that the said circle is maintained at a constant and stable diameter. Hence, he will be able to observe simultaneously indications of the directional course and of the descending path.

The invention, as has hereinbefore been pointed out, is capable of a great number of modifications. In order to simplify the receiver, it would be feasible to subject the two transmitters to double modulation. The transmitters may, for example, operate on two neighboring ultra-short carriers (7 and 8 meters, as hereinbefore indicated) the modulation frequencies being at, say, 3 megacycles or 100 meters for one, and at 2.5 megacycles or 120 meters for the other. Thereupon, as previously, the energy radiated by the two transmitters may again be modulated by the same but much lower frequency, 500 kilocycles or 600 meters, for instance. A fixed phase displacement of 90° between the waves of the two low frequency modulations will preferably be maintained. A more complete description of the transmitter arrangements will be hereinafter supplied under the caption of Fig. 8.

Figure 5:
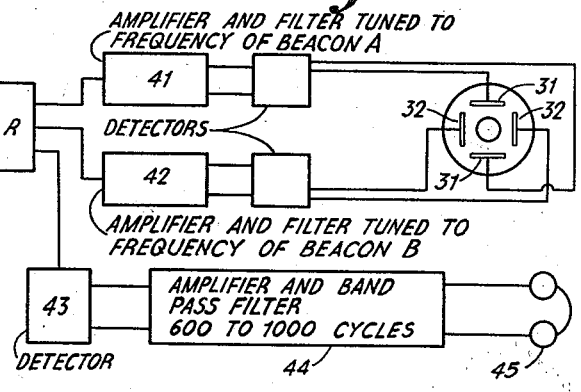
Fig. 5 is a diagram of a schematic arrangement of circuits in connection with a radio receiver to be employed for the carrying out of my invention.

Fig. 5 shows a receiver R which comprises a single short-wave circuit tuned to the mean length of the waves of the two radio-beacons (7 and 8 meters), whose damping is such that the two transmissions are received simultaneously with like intensity. Better still, an aperiodic receiving circuit may be employed.

After the first detection, the resultant intermediate frequency energy will work upon two resonant amplifiers 41 and 42 tuned, respectively, to the two frequencies 3.0 and 2.5 megacycles. Separation of the signals coming from the two transmitters or beacons is thus obtained. The potentials delivered by these two amplifiers as output energy therefrom are again rectified and applied respectively to each of two pairs of deflector plates 31 and 32 of the oscillograph. The 90°-phase displacement between the low frequency modulation components of the two signals gives a normally circular deflection to the electron beam in the cathode ray tube oscillograph.

According to a slightly different embodiment of the invention the phase displacement of the low modulation frequency introduced in the two transmitters, instead of being held constant at 90° may be varied at a low frequency (50 or 100 periods per second) between two symmetric values. This phase angle could vary, for instance, between 70° and 110° while passing alternately from one of these values to the other as rapidly as feasible.

Figure 6:
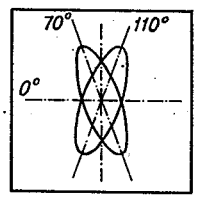
Fig. 6 is still another representation of images to be formed by a cathode ray oscillograph.

Under these conditions, when the airplane is kept on a course denoting equal distance from the two transmitters, the electron beam in the oscillograph will describe two symmetric ellipses, as shown in Fig. 6, rather than one circle. That at least will be the impression created on the retina, due to the persistence of vision. As soon as the pilot deviates from the landing axis, he will note that one of these two ellipses becomes inclined or sloped and flattened according to the sense or direction of the departure from the true course, whereas the other ellipse will tend to assume a circular form. Hence, the pilot will have a still clearer indication for his guidance in making a landing. As in the first case, the size of the diagram will indicate the curve of equal field intensity that is followed, that is to say, the path or trajectory of descent.

The arrangements hereinbefore described may be readily combined with other arrangements affording the pilot additional clues. For instance, it may be desirable to indicate to the pilot the precise instance when, on following his landing axis, he passes within certain distances from the airport.

Figure 7:
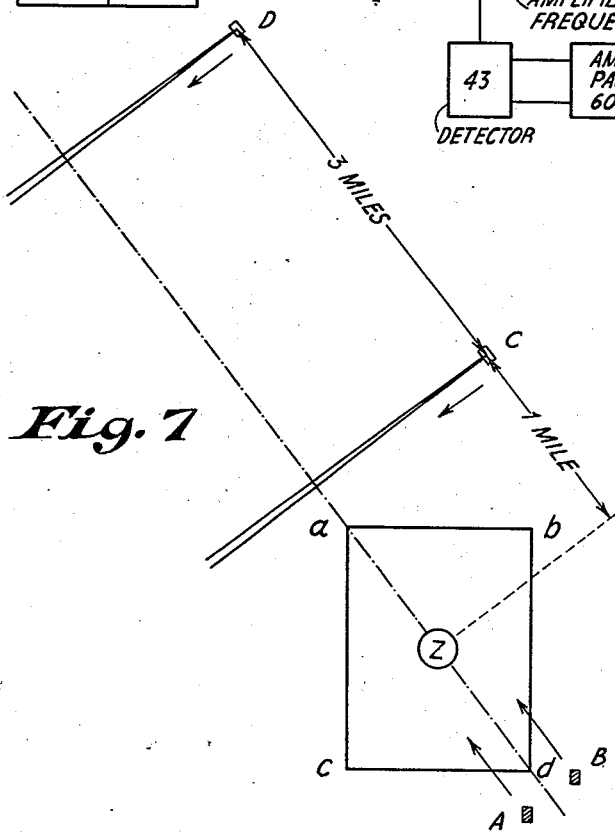
Fig. 7 is a map of a typical landing field having located adjacent thereto a number of different radio beacons.

Referring to Fig. 7, the airport is indicated by a rectangle having corners $a$, $b$, $c$, and $d$, while at A and B are mounted the two radio beacons which send out signals on short carrier waves, the respective lengths of which may be designated $\lambda+e$ and $\lambda-e$. Phase differentiated modulations of a lower frequency $F_3$ may be applied to these carriers as hereinbefore indicated. These two radio-beacons when aimed in the direction of the arrows shown adjacent thereto define the landing axis $a-d$ to be followed by the airplane. There are represented further at C and D two radio buoys or beacons each giving off a very narrow beam at right angles to the landing axis. The two transverse beacons C and D work, for instance, upon one and the same wave-length $\lambda$, to be picked up by the airplane receiver R which has been tuned to the same wave-length. The transverse beacons are modulated by two dissimilar acoustic frequencies (say, 600 and 1000 cycles) which can be readily read by a headset 45. For this purpose a detector 43 and an amplifying band pass filter 44 are provided (Fig. 5), the output energy from which is conducted to the ear phones 45.

Figure 8:
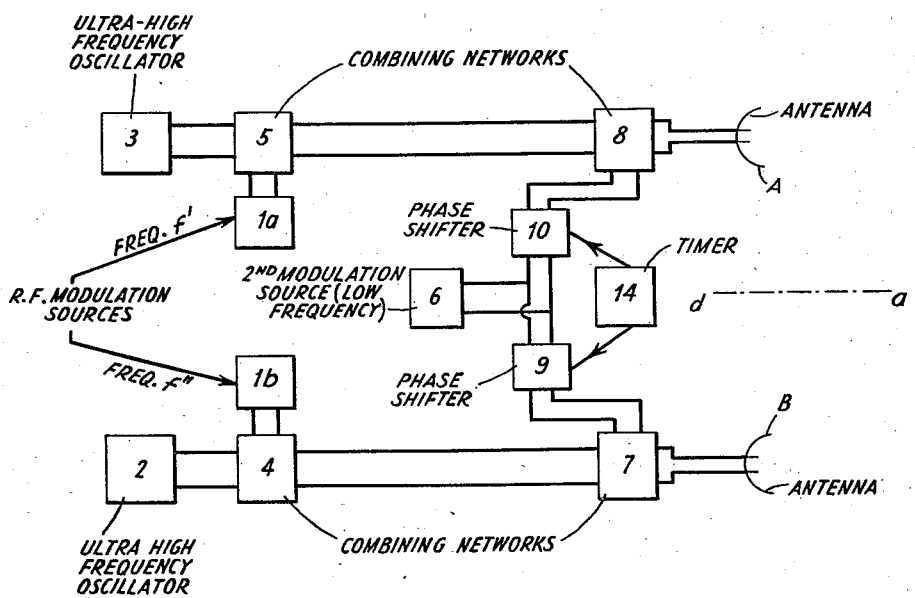
Fig. 8 is a conventional circuit diagram illustrating a preferred arrangement to be used at the transmitter.

Fig. 8 shows by way of illustration a preferred arrangement of apparatus to be used at the transmitter for controlling the radiation of energy from two separate antennae A and B. Two ultra high frequency oscillators 2 and 3 are provided. The oscillator 2 feeds to the antenna B, while the oscillator 3 feeds to the antenna A. The energy from oscillator 3 may be modulated by radio frequency oscillations of the frequency $f'$ derived from the source $1a$ and combined therewith through the combining network 5. A similar arrangement is provided in connection with the ultra high frequency source 2, the energy from which is modulated by a frequency $f''$ as derived from the source 1b and applied thereto in the combining network 4.

A second source 6 is also utilized for obtaining a low frequency modulation. The energy from this source is first fed through phase-shifters 9 and 10, in the one case for combination with the energy from the combining network 4, and applied thereto by the network 7 for sending out doubly modulated signals on the antenna B. On the other hand, the energy which passes through the phase-shifter 10 is applied as a second modulation of the already modulated energy from the combining network 5, the second combination being obtained through the network 8 whence it is fed to the antenna A. A timer 14 serves to periodically vary the phase displacements between the modulations from the second modulation source 6. This timer is, therefore, caused to control the phase-shifters 9 and 10 so as to maintain a 90° lead of the first modulation applied to antenna B over that which is applied to the antenna A, and subsequently to provide a 90° lag as to the energy from the antenna B with respect to that of antenna A. The periodicity of the timer 14 is such that, due to the persistence of vision, two superimposed images may be formed on the cathode ray tube screen to be utilized at the receiver. Images such as shown at Fig. 6 are, therefore, obtained at the receiver.

I claim:

1. A device for guiding airplanes in blind flying, comprising two radio-beacons, means for causing each of said beacons to radiate a different ultra-short wave, means at each of said beacons for causing said waves to be modulated at the same relatively lower frequency but with a certain phase difference, and a receiver mounted on board an aircraft and comprising means including separate filter circuits for separately utilizing the signaling energies from the two beacons, and means including a visual image producing device having circuits corresponding with the horizontal and vertical components of the image to be produced, the last said circuits being separately controlled by energies fed through said filter circuits respectively for showing a two-dimensional pattern the shape of which indicates the course to be followed and the size of which indicates the landing trajectory.

2. In a radio beacon and blind landing system, transmitting apparatus having energy sources of two different ultra-high frequencies, means including a pair of first modulation sources of radio frequency energy each for respectively modulating the energies from the first named sources, means including a second modulation source of relatively low frequency for again modulating said energies, means including combining networks for superposing the modulation frequencies separately upon each of the ultra-high frequencies, phase shifting means for producing a phase difference between the energies from the second modulation source as applied respectively to the energies from the two ultra-high frequency sources, a pair of directional antennae for separately radiating the modulated energies from the ultra-high frequency sources, a timer for periodically varying the phase displacements of the phase shifting means, and receiving apparatus responsive to the energies radiated by said antennae for indicating simultaneously a course to be followed and a landing trajectory.

3. A device in accordance with claim 1 and having means included in the equipment of said radio beacons for shifting the phase relation of said modulations so as to produce a periodic fluctuation thereof between two values symmetric to a certain preferential mean value which mean value provides a phase displacement of 90 electrical degrees between the two low frequency modulations of the two respective beacons.

4. A system in accordance with claim 2 and including additional transmitting apparatus and directional beam radiators for emitting acoustically modulated wave energy of the same radio frequency as the energy of said first modulation source, the last said radiators being so oriented as to emit said energy in beams transverse to the axis of radiation from the antennae named in the parent claim, the receiving apparatus being further provided with head phones for intercepting signals emitted by said transverse beam radiators, thereby to give an indication of distance between the aircraft which carries said receiving apparatus and the field on which the beacon system is intended to guide said aircraft to a safe landing.

5. The method of producing indications on the screen of a cathode ray tube for the guidance of an aircraft pilot when making a blind landing, which comprises, emitting directional ultra-high frequency beams from each of two points adjacent a landing field, orienting the axes of said beams in a general direction toward the point of approach of the aircraft, modulating the carrier wave energy of said beams, each at a frequency different from that of the other, superimposing on each of said beams a second modulation of one frequency but with a phase difference therebetween as applied to the respective beams, simultaneously receiving and detecting the combined radiations of the two beams, separating the modulation components of the respective beams one from another, detecting the phase-differentiated modulations and utilizing the same as horizontal and vertical deflecting forces in response to which an electron beam in said cathode ray tube is caused to describe a significant visual pattern.

6. In the operation of a cathode ray tube for visual guidance of an aircraft pilot when making a blind landing, the method of horizontally and vertically deflecting the electron beam in said tube, which comprises, receiving and detecting radio frequency energy from two fixed sources adjacent an airport whereon the pilot is to make a landing, causing the modulation components of energy from one of said sources to control the amplitude of deflection of said electron beam in a horizontal direction, producing a deflection of the beam in a vertical direction, the amplitude of which is controlled by energy from the other of said sources, directing the beams from said sources so that the pilot may steer the aircraft along a descending line of uniform field intensity of said beams until he reaches a landing point where said line is substantially leveled off and the ground becomes tangent thereto, and causing the pattern described by said electron beam to indicate horizontal departures from the proper course by distortion of a circle into an ellipse, while indicating vertical departures from said course by variations in the diameter of said circle.

HENRI CHIREIX.